US 9,426,685 B2

(12) United States Patent
Paliwal et al.

(10) Patent No.: US 9,426,685 B2
(45) Date of Patent: Aug. 23, 2016

(54) METHOD AND SYSTEM FOR MITIGATION OF UNLISTED CELL IMPACTS IN IDLE MODE OF CELLULAR SYSTEMS

(75) Inventors: Vikas Paliwal, Old Bridge, NJ (US); Xiaoxin Qiu, Basking Ridge, NJ (US); Zhijun Gong, Iselin, NJ (US)

(73) Assignee: Broadcom Corporation, Irvine, CA (US)

( * ) Notice: Subject to any disclaimer, the term of this patent is extended or adjusted under 35 U.S.C. 154(b) by 1174 days.

(21) Appl. No.: 12/851,368

(22) Filed: Aug. 5, 2010

(65) Prior Publication Data

US 2012/0015653 A1   Jan. 19, 2012

Related U.S. Application Data

(60) Provisional application No. 61/365,094, filed on Jul. 16, 2010.

(51) Int. Cl.
*H04W 36/30* (2009.01)
*H04W 24/10* (2009.01)
*H04W 48/18* (2009.01)

(52) U.S. Cl.
CPC .............. *H04W 24/10* (2013.01); *H04W 48/18* (2013.01)

(58) Field of Classification Search
CPC ..... H04W 36/08; H04W 36/24; H04W 16/18; H04W 48/20; H04W 48/16
See application file for complete search history.

(56) References Cited

U.S. PATENT DOCUMENTS

| | | | | |
|---|---|---|---|---|
| 6,041,235 A * | 3/2000 | Aalto | ................... | H04W 36/20 455/437 |
| 8,805,372 B2 * | 8/2014 | Cook | ................ | H04W 36/0083 455/436 |
| 2004/0252656 A1 * | 12/2004 | Shiu | ................... | H04B 1/70754 370/328 |
| 2005/0070267 A1 * | 3/2005 | Vishwanath et al. | ...... | 455/422.1 |
| 2005/0272425 A1 * | 12/2005 | Amerga | ............. | H04B 1/70735 455/436 |
| 2006/0172707 A1 * | 8/2006 | Stern-Berkowitz et al. | .......................... | 455/67.11 |
| 2007/0270155 A1 * | 11/2007 | Nelson et al. | ............... | 455/452.2 |
| 2008/0004023 A1 * | 1/2008 | Chen | ................ | H04W 52/0229 455/436 |
| 2008/0096566 A1 * | 4/2008 | Brunner et al. | ................ | 455/437 |
| 2009/0047956 A1 * | 2/2009 | Moe et al. | ...................... | 455/436 |
| 2010/0130202 A1 * | 5/2010 | Yu | ......................... | H04W 24/10 455/434 |
| 2010/0226264 A1 * | 9/2010 | Axmon | ............... | H04J 11/0079 370/252 |
| 2010/0331019 A1 * | 12/2010 | Bhattacharjee et al. | ...... | 455/458 |
| 2011/0201279 A1 * | 8/2011 | Suzuki et al. | .............. | 455/67.11 |
| 2013/0137427 A1 * | 5/2013 | Krishnan | ............ | H04W 56/001 455/434 |

* cited by examiner

*Primary Examiner* — Vladimir Magloire
*Assistant Examiner* — Frank Donado
(74) *Attorney, Agent, or Firm* — Sterne, Kessler, Goldstein & Fox P.L.L.C

(57) ABSTRACT

A UE, in an idle mode, receives pilot signals and synchronization signals from a serving cell and neighbor cells comprising neighbor cells listed and/or unlisted in a neighboring cell list. The UE validates each of the serving cell, the listed neighbor cells and the unlisted neighbor cells from the received signals. The UE performs cell measurement on the listed cells as well as the unlisted cells for multipath profiles and associated power levels. In instances where number of attempts of the cell measurements on the unlisted cells exceeds a threshold value, the UE may validate presence of the unlisted cells. The best available cell is selected from the listed cells and the unlisted for the UE to camp on. I/Q samples of the received signals are stored while measuring or monitoring the cells. The stored I/Q samples may be utilized to carry out baseband procedures through offline processing.

22 Claims, 7 Drawing Sheets

METHOD AND SYSTEM FOR MITIGATION OF UNLISTED CELL IMPACTS IN IDLE MODE OF CELLULAR SYSTEMS

CROSS-REFERENCE TO RELATED APPLICATIONS/INCORPORATION BY REFERENCE

This patent application makes reference to, claims priority to and claims benefit from U.S. Provisional Patent Application Ser. No. 61/365,094 filed on Jul. 16, 2010.

The above stated application is hereby incorporated herein by reference in its entirety.

FIELD OF THE INVENTION

Certain embodiments of the invention relate to communication systems. More specifically, certain embodiments of the invention relate to a method and system for mitigation of unlisted cell impacts in idle mode of cellular systems.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier-Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage areas need to determine one or more cell specific transmission parameters such as, for example, symbol timing, radio frame timing, and/or a cell ID. In the LTE/E-UTRA standard, the cell-specific information is carried by reference, broadcast, and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for mitigation of unlisted cell impacts in idle mode of cellular systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for mitigation of unlisted cell impacts in idle mode of cellular systems. In various embodiments of the invention, a UE, in an idle mode, is operable to receive signals such as pilot signals and synchronization signals from a serving cell and/or a plurality of neighbor cells. The neighbor cells may comprise neighbor cells that are listed in a neighboring cell list received from the network, and one or more neighbor cells that are not listed in the received neighboring cell list. The UE may validate the serving cell, the listed neighbor cells and the one or more unlisted neighbor cells, for example, by confirming corresponding identity information, from the received signals. Cell measurement such as measurement for multipath profiles and associated power levels may be performed on the listed cells as well as the unlisted cells. The UE is operable to maintain a counter for tracking the number of attempts of the cell measurements that are greater than a signal strength threshold value for the unlisted cells. In instances where the counted number exceeds a threshold value, the UE may declare or validate the presence of the unlisted cells. Cell selection and/or reselection may be optimized based on the cell measurements for the listed and unlisted cells to enhance UE performance such as UE paging performance. For example, the UE is operable to select the best available cell from physically available cells in a geographic area of interest regardless of whether the physically available cells are listed or unlisted in the neighboring cell list. The UE may camp on the selected best available cell for one or more desired services. The UE, which may comprise one or more rake receivers, may be configured, for example, to assign rake fingers, based on the cell measurements for the serving cell, to receive signals. I/Q samples of the received signals may be collected or stored while monitoring or measuring the cells. The UE may turn off the receiver RF front-end to save power if enough I/Q samples are stored. Interference caused by the unlisted cells may be eliminated or mitigated from the stored I/Q samples based on the cell measurements for the unlisted cells. The stored I/Q samples may be utilized to support or perform various baseband procedures such as cell search through offline processing subsequent to interference processing.

Figure 1:
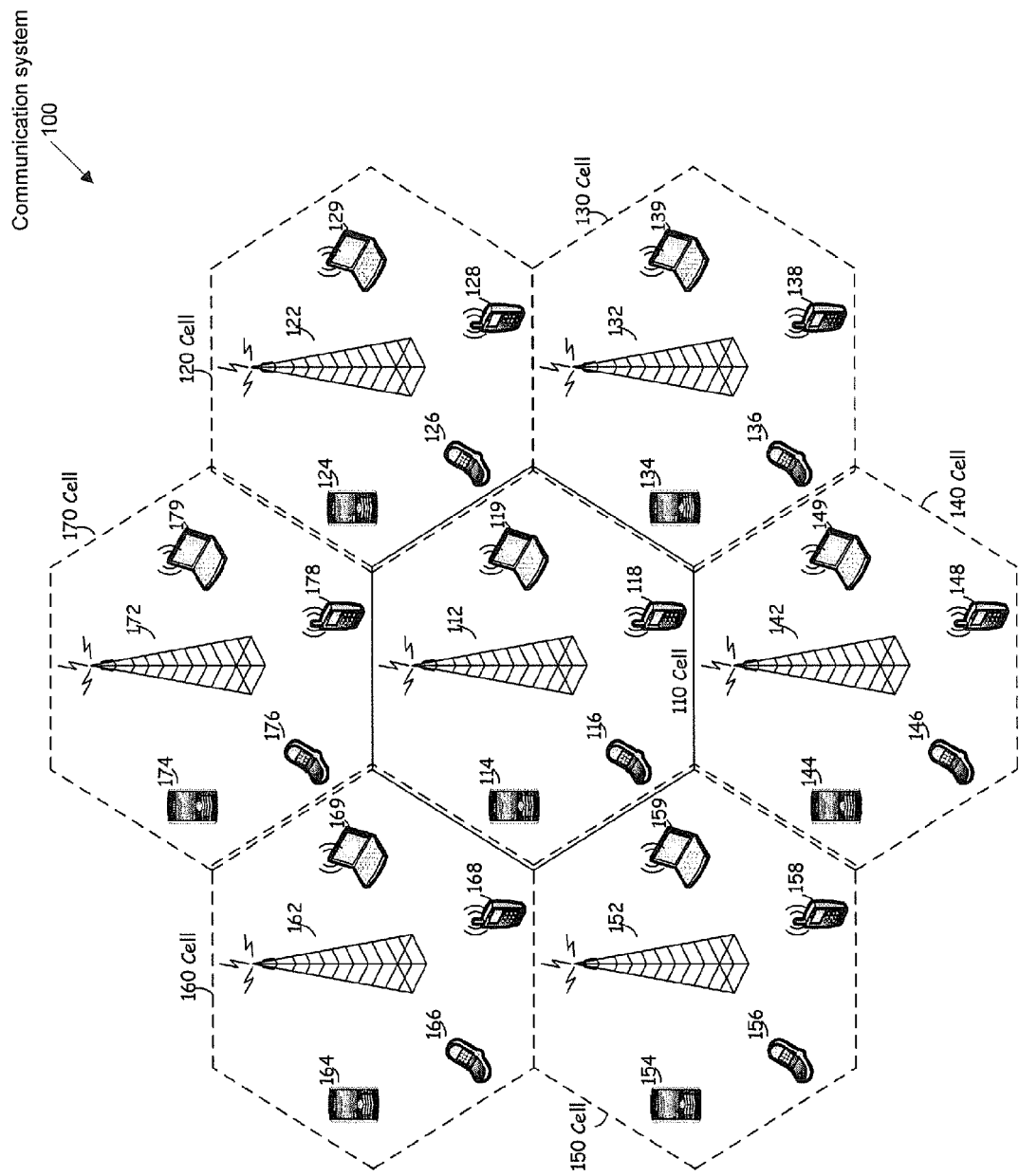
FIG. 1 is a diagram illustrating an exemplary communication system that is operable to support mitigation of unlisted cell impacts in idle mode of cellular systems, in accordance with an embodiment of the invention.

FIG. 1 is a diagram illustrating an exemplary communication system that is operable to support efficient mitigation of unlisted cell impacts in idle mode of cellular systems, in accordance with an embodiment of the invention. Referring to FIG. 1, there is shown a communication system 100. The communication system 100 comprises a plurality of cells, of which cells 110-170 are illustrated. Each of the cells 110-170 comprises a base station and a plurality of user equipment (UEs), of which base stations 112-172 and UEs 114-119 through 174-179 are illustrated for the cells 110-170, respectively.

The cells 110-170 comprise geographical areas covered or served by the base stations 112 through 172, respectively. A cell such as the cell 110 may be identified by a unique cell identifier (Cell-ID). For each UE within the communication system 100, a cell may operate as an active cell, a candidate cell or a neighbor cell. With regard to a particular UE, an active cell is a cell that is currently connected to the particular UE. An active cell from which the particular UE receives grants for resource scheduling and/or other signaling is called a serving cell for the particular UE. A candidate cell is a cell that is not currently connected to the particular UE, but that has associated pilot or reference signals strong enough to be added to an active cell list for the particular UE. A neighbor cell is a cell that is continuously measured by the particular UE and that has corresponding pilot or reference signals not strong enough to be added to the active cell list for the particular UE. One or more neighbor cells may be associated with the particular UE.

A base station such as the base station 112 may comprise suitable logic, circuitry, interfaces and/or code that are operable to control and schedule communication in an uplink direction and/or downlink direction within the cell 110. The base station 112 may be operable to manage radio resources such as, for example, radio bearer control, radio admission control, connection mobility control, and/or dynamic allocation of radio resources within the cell 110. The base station 112 may utilize physical channels and physical signals for communications in both the uplink and the downlink communication. The physical channels may carry information from higher layers to communicate user data as well as user control information. The physical signals such as reference signals and synchronization signals may not carry information from higher layers.

Reference signals, also called pilot signals, which are received from the base station 112, may be utilized by UEs in the cell 110 to determine channel impulse responses (CIRs). A specific reference signal or a pilot signal is assigned to each cell within a network and acts as a cell-specific identifier. Synchronization signals may comprise primary synchronization signals (PSS) and secondary synchronization signals (SSS). The base station 112 may utilize specific physical channels such as, for example, Common Pilot Channel (CPICH), Primary Synchronization Channel (PSCH) and Secondary Synchronization Channel (SSCH) to communicate or transmit pilot signals, PSS signals and SSS signals, respectively, to UEs. The CPICH may be a continuous channel and may be transmitted in each time slot of 675 µs, for example, to support channel estimation at UEs. The PSCH and the SSCH are discontinuous channels and may be transmitted repeatedly, for example, in each subframe of 5 ms. The PSCH may carry identity information of an associated base station or cell within a cell group. The UEs may utilize the PSCH, through the PSS synchronization (PSYNC), to identify or detect time slot timing of the cell. The SSCH may carry information about the cell group, encoded with a scrambling sequence or code, which is unique to an associated mobile device. The scrambling code may be linked or mapped to, for example, the index of the PSS over the PSCH. After successful timing and frequency synchronization via the PSYNC operation, the frame boundary synchronization and/or the cell identification may be performed via SSS detection or synchronization (SSYNC). The transmission of the PSCH and the SSCH may allow timing and frequency offset issues to be resolved before cell-specific information may be determined. This may reduce complexity in, for example, cell search, for associated UEs such as the UE 114.

A UE such as the UE 114 may comprise suitable logic, circuitry, interfaces and/or code that are operable to communicate radio frequency signals with the base station 112. Initially, the UE 114 may need to carry out cell search to identify and synchronize to the cell 110 prior to communicating information with the base station 112. The cell search refers to as a process of searching for a cell and synchronizing to transmission timing of the cell. The UE 114 may be operable to carry out cell search at various circumstances such as, for example, upon initial power-up, in an idle mode and/or in an active mode. Upon initial power-up, the UE 114 may need to carry out a cell search, namely, an initial cell search, followed by acquisition, registration and other procedures. In accordance with an embodiment of the invention, a 3-stage cell search may be performed by the UE 114 for the initial cell search. During the first step of the 3-stage cell search, the UE 114 may be tuned to frequencies of interest. The UE 114 may start the initial cell search by utilizing the PSCH to acquire slot synchronization to the strongest cell such as the cell 110. The UE 114 may be operable to identify slot timing for the cell 110 by accumulating PSCH on slot timing hypotheses. The first step of the 3-stage cell search is also referred to as a PSYNC stage. During the second step of the 3-stage cell search, the UE 114 may utilize the SSCH to acquire frame synchronization and identify the code group of the cell found in the first step. The second step of the 3-stage cell search is also referred to as a SSYNC stage. During the third step of the 3-stage cell search, the UE 114 may determine the exact scrambling code utilized by the cell found in the first step. The UE 114 may be operable to identify the scrambling code for the cell through correlation over the CPICH with scrambling codes within the code group identified in the second step. The third step of the 3-stage cell search is also referred to as a CPICH accumulation stage. The CPICH accumulation stage may function as a multipath detector (MPD) to measure or detect multipath profiles for a cell.

In the idle mode, no valid or active connection is established between the UE 114 and the base station 112; however, associated registration information may be retained in the cell 110 or network. The UE 114 may be operable to perform cell search, namely, an idle mode cell search, for finding a suitable cell to camp on when needed. During the idle mode cell search, the UE 114 may continuously search for new cells or base stations on the current and/or other carrier frequencies. The idle mode cell search may be carried out in basically the same way as the initial cell search. The main difference compared to the initial cell search is that in an idle mode, the UE 114 may receive a neighboring cell list or a cell priority list in the System Information Blocks (SIBs) from the network. The neighboring cell list may be continuously updated by the network to reflect the changing neighborhood for a moving status of the UE 114. The received neighboring cell list may comprise cell identity information such as, for example, downlink scrambling codes (PSCs), of corresponding cells in network. The received neighboring cell list may indicate in which order the PSCs should be searched. With known PSCs in the received neighboring cell list, the idle mode cell search may be optimized by eliminating the SSYNC stage because the CPICH may be accumulated, for example, 10 times, faster than the SSYNC and with a far better accuracy. In this regard, the UE 114 may perform, for example, a 2-stage cell search comprising the PSYNC stage and the CPICH accumulation stage or MPD for the idle mode cell search.

In the active mode, the UE 114 may have established valid or active connections with the base station 112 for communicating data and/or voice services with network. The UE 114 may perform cell search, namely, an active mode cell search, to identify handover candidates when needed. During the active mode cell search, the UE 114 may be operable to continuously search for new cells or base stations on the current carrier frequency. The active mode cell search is carried out in basically the same way as the idle mode cell search.

For idle mode cell search and active mode cell search, the UE 114 may be configured to perform cell search based on the neighboring cell list provided by the network to determine the available cells in a particular geographical area of interest. However, the neighboring cell list may not be sufficient to capture each of the physically available neighboring cells in the particular geographical area of interest. The presence of a large number of unlisted cells in the particular geographical area of interest may cause impairments or interference leading to lower signal to noise ratios (SNRs) for the current serving cell and deteriorates UE performance such as the paging performance for a UE in an idle mode.

In an exemplary embodiment of the invention, in an idle mode, the UE 114 may be operable to concurrently identify the presence of one or more unlisted cells while monitoring the CPICH. In this regard, the UE 114 may be operable to calculate or estimate the signal strength for each PSS peak based on the absolute correlation magnitude of the PSS peak and the mean noise level. The signal strength estimate for a particular PSS peak may be utilized to approximate a signal level indicator such as signal to noise ratio SNR and/or signal to interference and noise ratio (SINR) corresponding to the particular PSS peak. In this regard, during an idle mode cell search, the UE 114 may maintain a counter to track PSS peaks with corresponding signal strength estimates, which may be greater than a preset threshold value such as −16 dB. In instances where identity information of a cell in the neighboring cell list is identified to match the tracked PSS peaks, the UE 114 may declare or validate presence of a listed cell such as the cell 130. In instances where the counter exceeds a certain number or value without finding a match in the neighboring cell list provided by the network for the tracked PSS peaks, the UE 114 may declare or validate the presence of unlisted cells such as the cells 150-170.

In an exemplary embodiment of the invention, in an idle mode, the UE 114 may be operable to concurrently collect incoming In-phase/Quadrature (I/Q) samples on the CPICH while the UE 114 reads or receives the CPICH and performs PSYNC operation for listed neighbor cells such as the cells 120-130. In instances where enough I/Q samples on the CPICH are collected or stored, for example, over 6-8 time slots, the receiver RF front-end of the UE 114 may be turned off to save power.

In an exemplary embodiment of the invention, the UE 114 may be operable to optimize cell reselection by performing cell search or reselection for known listed and unlisted cells that may be present in a geographic area of interest. For example, in instances where the serving cell for the UE 114 is deteriorating, the UE 114 may decide to camp on the best available cell in the geographic area of interest after reading corresponding system information even the best available cell is not listed in the neighboring cell list provided by the network. In this regard, the UE 114 may be operable to start camping procedures on the unlisted cell without going through frequency and band scan followed by extensive search. The enhancement on the scope of cell selection for the UE 114 may offer a quick way of finding the best available cell in a particular geographic area regardless of whether the best available cell is listed in the neighboring cell list provided by the network for the particular geographic area.

In an exemplary embodiment of the invention, the UE 114 may be operable to carry out cell search for both listed cells and unlisted cells through offline processing. In this regard, the UE 114 may be configured to utilize stored or collected I/Q samples on the CPICH for cell search without turning on and/or utilizing the associated receiver RF front-end.

In an exemplary embodiment of the invention, the UE 114 may be operable to cancel or mitigate interference caused by unlisted cells to enhance the paging performance in an idle mode. In this regard, upon the detection of an unlisted cell, the UE 114 may add the unlisted cell to its cell measurement list as if it were a listed cell. The cell measurement list for the UE 114 may comprise identity information for cells of which the UE 114 may be configured to measure multipath profiles and associated power levels. The multipath profiles may comprise the number of multipath taps and delay of each multipath component. The UE 114 may be operable to perform cell measurement on both listed cells and unlisted cells. The resulting cell measurements for unlisted cells may be utilized by the UE 114 to eliminate, mitigate or cancel interference components caused by the corresponding unlisted cells from subsequent cell searches.

In an exemplary operation, a UE such as the UE 114 may be operable to carry out cell search to identify a cell and synchronize to the cell timing in order to communicate information with the identified cell such as the cell 110. The cell search may be performed through a PSYNC stage, a SSYNC stage and/or a CPICH accumulation stage (MPD). The UE 114 may skip the CPICH accumulation stage during the cell search if PSC information that is utilized by cells is known to the UE 114. For example, in an idle mode, the UE 114 may search for a suitable cell to camp on whenever needed. During the idle mode cell search, the UE 114 may concurrently monitor or identify the presence of listed cells as well as unlisted cells. The UE 114 may be operable to collect or store incoming I/Q samples on the CPICH while monitoring the CPICH and performing PSYNC operation for the listed cells. In instances where enough I/Q samples for the CPICH are collected or stored, the UE 114 may be operable to turn off or reduce power utilized by the receiver RF front-end. This may result in saving of power. The stored I/Q samples may be utilized to continue the idle mode cell search through offline processing. In this regard, the UE 114 may be operable to perform offline cell search on both listed cells and unlisted cells available at a geographic area of interest. Cell measurement such as multipath profile measurement and associated power levels may be performed on the listed cells as well as the unlisted cells. The resulting cell measurements for the listed cells may be utilized to configure the receiver of the UE 114 for subsequent cell searches. The resulting cell measurements for the unlisted cells may be utilized to eliminate or cancel interference caused by the unlisted cells from subsequent cell searches. The UE 114 may be operable to select and camp on the best available cell for an optimized cell reselection even the best available cell is not listed in the neighboring cell list provided by the network. For example, in instances where the serving cell for the UE 114 is deteriorating, the UE 114 may be configured to select the best available cell in the geographic area of interest after reading corresponding system information regardless of whether the selected cell is a listed cell or an unlisted cell.

Figure 2:
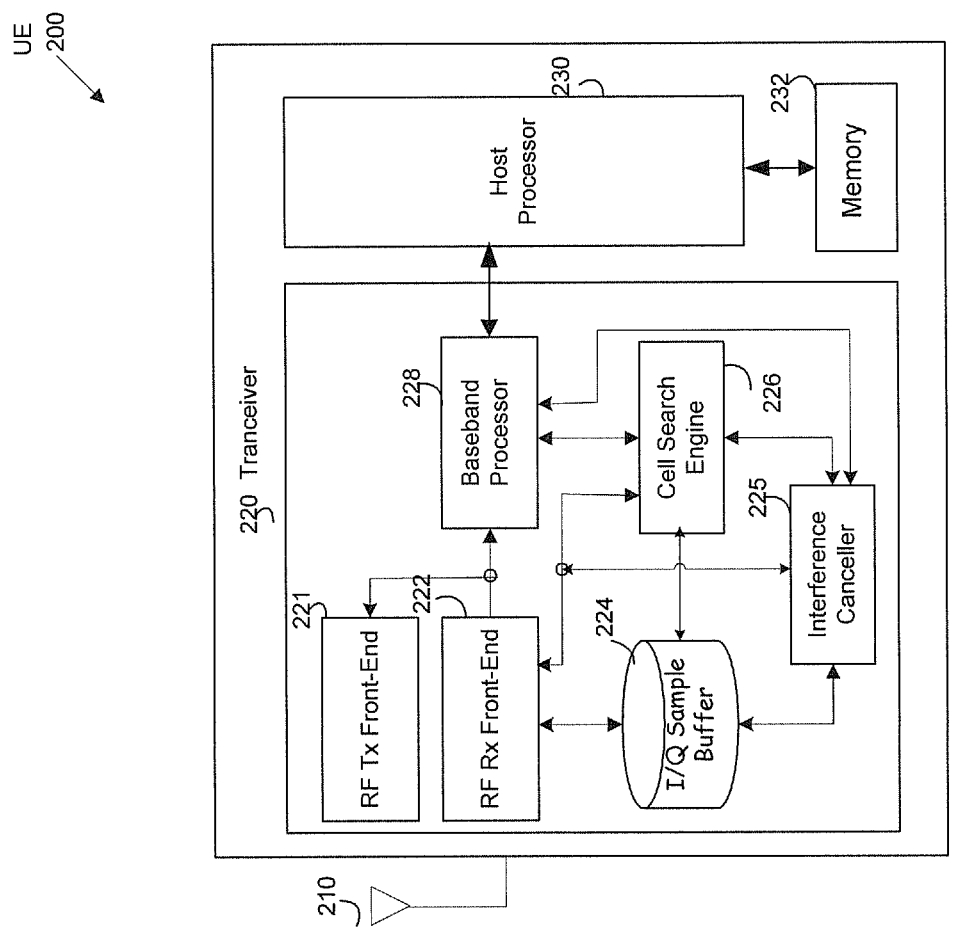
FIG. 2 is a block diagram illustrating exemplary user equipment that is operable to facilitate mitigation of unlisted cell impacts in idle mode, in accordance with an embodiment of the invention.

FIG. 2 is a block diagram illustrating exemplary user equipment that is operable to facilitate mitigation of unlisted cell impacts in idle mode, in accordance with an embodiment of the invention. Referring to FIG. 2, there is shown user equipment (UE) 200. The UE 200 comprises an antenna 210, a transceiver 220, a host processor 230 and a memory 232. The transceiver 220 comprises a radio frequency (RF) transmit (Tx) front-end 221, a RF receive (Rx) front-end 222, an I/Q sample buffer 224, a cell search engine 225, an interference canceller 226 and a baseband processor 228.

The antenna 210 may comprise suitable logic, circuitry, interfaces and/or code that may be operable to transmit and/or receive electromagnetic signals. Although a single antenna is illustrated, the invention is not so limited. In this regard, the transceiver 220 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 220 may comprise suitable logic, circuitry, interfaces and/or code that may be operable to transmit and/or receive RF signals adhering to one or more wireless standards such as the LTE/E-UTRA standard.

The RF Tx front-end 221 may comprise suitable logic, circuitry, interfaces and/or code that may be operable to process RF signals for transmission. The RF Tx front-end 221 may be operable to receive baseband signals from the baseband processor 226 and convert the baseband signals to corresponding RF signals for transmission via the antenna 210.

The RF Rx front-end 222 may comprise suitable logic, circuitry, interfaces and/or code that may be operable to process RF signals received, for example, over a LTE/E-UTRA air interface, via the antenna 210. The RF Rx front-end 222 may be operable to convert the received RF signals to corresponding baseband signals. The resulting baseband signals may be communicated with the baseband processor 226 for further baseband processing.

The I/Q sample buffer 224 may comprise suitable logic, circuitry, interfaces and/or code that may be operable to collect and/or store I/Q samples, over the CPICH, from the RF Rx front-end 222 over a time period of, for example, 6-8 time slots. The stored I/Q samples may be utilized to enable or support offline processing for various baseband procedures such as cell search, interference cancellation and channel equalization. The I/Q sample buffer 224 may comprise RAM, ROM, low latency nonvolatile memory such as flash memory and/or other suitable electronic data storage.

The interference canceller 225 may comprise suitable logic, circuitry, interfaces and/or code that may be operable to perform interference cancellation over I/Q samples from the RF Rx front-end 222. In this regard, the interference canceller 225 may be operable to eliminate or cancel interference caused by unlisted cells from subsequent cell searches. I/Q samples stored in the I/Q sample buffer 224 may be utilized by the interference canceller 225 for interference cancellation through offline processing.

The cell search engine 226 may comprise suitable logic, circuitry, interfaces and/or code that may be operable to perform cell search. Depending on the operating mode and/or conditions of the UE 200, the cell search engine 226 may carry out PSYNC operation, SSYNC operation and/or CPICH accumulation operation so as to identify or detect the presence of neighbor cells. In various exemplary embodiments of the invention, the cell search engine 226 may be operable to detect the presence of unlisted cells as well as listed cells based on corresponding signal strength estimates. The cell search engine 226 may be operable to perform cell search for listed cells and unlisted cells when, for example, the UE 200 needs to setup a connection with the network. In this regard, the cell search engine 226 may be operable to optimize cell search by communicating utilizing the best available cell in a geographic area of interest after reading corresponding system information regardless whether the best available cell is listed in the neighboring cell list provided by the network. The cell search may be performed utilizing real-time I/Q samples on the CPICH from the RF Rx front-end 222. The cell search may also be performed offline by utilizing stored I/Q samples without turning on the RF Rx front-end 222. Interference caused by unlisted cells for the I/Q samples on the CPICH may be eliminated or cancelled via the interference canceller 225 from subsequent cell search.

The baseband processor 228 may comprise suitable logic, circuitry, interfaces and/or code that may be operable to manage and/or control operations of the RF Tx front-end 221 and the RF Rx front-end 222, respectively. The baseband processor 228 may be operable to handle baseband signals to be transferred to the RF Tx front-end 221 for transmission and/or process baseband signals from the RF Rx front-end 222. In this regard, I/Q samples, on the CPICH, which are stored in the I/Q sample buffer 224 from the output of the RF Rx front-end 222, may be utilized by the baseband processor 228 to perform various baseband procedures such as, for example, cell search and channel equalization, through offline processing.

The host processor 230 may comprise suitable logic, circuitry, interfaces and/or code that may be operable to manipulate and control operation of device components such as the transceiver 220. The host processor 230 may be operable to communicate data with the transceiver 220 to support applications such as, for example, audio streaming on the UE 200.

The memory 232 may comprise suitable logic, circuitry, and/or code that may enable storage of information such as executable instructions and data that may be utilized by the host processor 230 as well as the transceiver 220. The executable instructions may comprise algorithms that may be applied to various baseband signal processes such as cell search, interference cancellation and/or channel equalization. The memory 232 may comprise RAM, ROM, low latency nonvolatile memory such as flash memory and/or other suitable electronic data storage.

In an exemplary operation, the transceiver 220 may be operable to communicate RF signals adhering to one or more wireless standards such as the LTE/E-UTRA standard. The RF signals may be converted to baseband signals that may be processed by the baseband processor 228 to support various baseband procedures such as cell search. Depending on the operation mode and/or conditions of the UE 200, the cell search engine 226 may carry out PSYNC operation, SSYNC operation and/or CPICH accumulation operation to determine or detect the presence of cells. In this regard, the cell search engine 226 may be operable to perform cell search for listed cells as well as unlisted cells in order to optimize cell search. In a geographic area of interest, the UE 200 may camp on the best available cell even in instances when the best available cell is not listed in the neighboring cell list provided by the network. Various baseband procedures such as cell search and interference cancellation may be performed utilizing I/Q samples stored in the I/Q sample buffer 224 through offline processing. The I/Q samples may be pre-processed via the interference canceller 225 to eliminate interference caused by unlisted cells for the I/Q samples.

Figure 3:
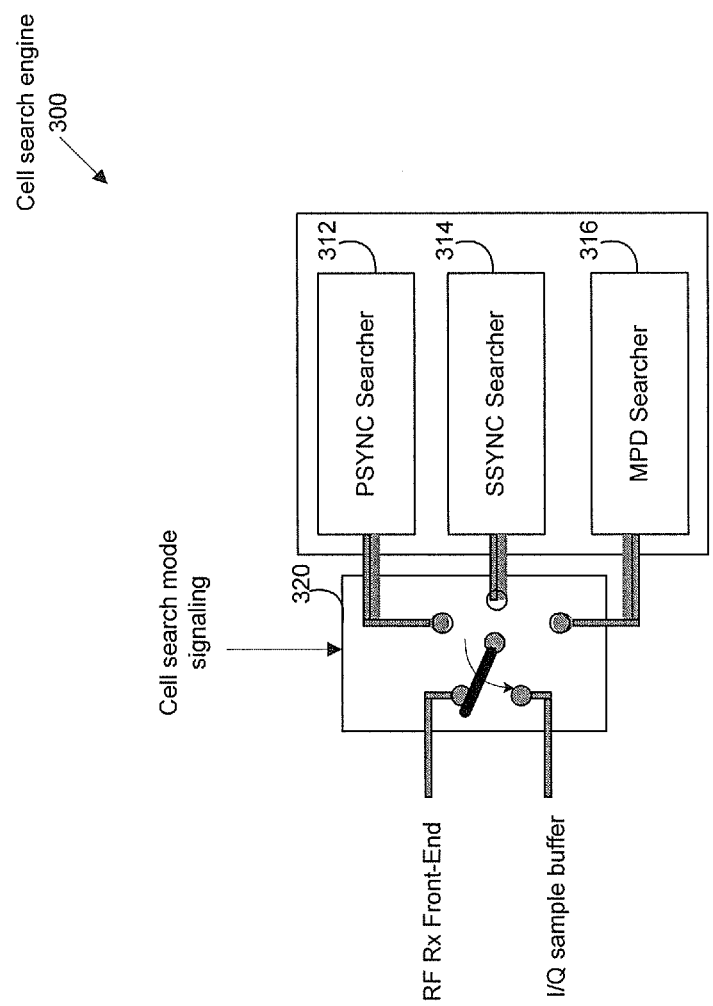
FIG. 3 is a block diagram illustrating an exemplary cell search engine that is operable to support cell search for listed and unlisted cells in an idle mode, in accordance with an embodiment of the invention.

FIG. 3 is a block diagram illustrating an exemplary cell search engine that is operable to support cell search for listed and unlisted cells in an idle mode, in accordance with an embodiment of the invention. Referring to FIG. 3, there is shown a cell search engine 300 comprising a PSYNC searcher 312, a SSYNC searcher 314, a MPD searcher 316 and a searcher switch 320.

The PSYNC searcher 312 may comprise suitable logic, circuitry, interfaces and/or code that may be operable to utilize PSCH to acquire slot timing for the strongest cell such as the cell 110. The PSYNC searcher 312 may be operable to identify or detect slot timing by accumulating PSCH on slot timing hypotheses.

The SSYNC searcher 314 may comprise suitable logic, circuitry, interfaces and/or code that may be operable to utilize SSCH to acquire radio frame timing for the strongest cell such as the cell 110. The SSYNC searcher 314 may be operable to identify or detect frame timing by accumulating SSCH on frame timing hypotheses.

The MPD searcher 316 may comprise suitable logic, circuitry, interfaces and/or code that may be operable to measure or detect multipath profiles for a cell based on accumulated CPICH. The MPD searcher 316 may be operable to calculate power levels associated with the measured multipath profiles of corresponding cells.

The searcher switch 320 may comprise suitable logic, circuitry, interfaces and/or code that may be operable to connect one of the PSYNC searcher 312, the SSYNC searcher 314 and the MPD searcher 316 to I/Q samples from the RF Rx front-end 222 or IQ samples stored in the I/Q sample buffer 224.

In an exemplary operation, the searcher switch 320 may be signaled by the host processor 230 for execution of a specific cell search mode such as an initial cell search, an idle mode cell search or an active cell search. For example, in instances where the UE 200 is initial powered-up or while doing a search for a PLMN (Public Land Mobile Network), the cell search engine 300 may be configured to carry out an initial cell search starting with PSYNC search operation followed by SSYNC search operation and MPD search operation. At this time, the UE 200 may have no information about the cells on a frequency and may need to attempt a search of each UARFCN (Universal Absolute Radio Frequency Number) sequentially. In order to capture a cell possibly at very low signal levels such as, for example, Ec/Io<−16 dB, the searcher switch 320 may be operable to pass real-time incoming I/Q samples sequentially from the RF Rx front-end 222 to the PSNC searcher 312. In this regard, a similar PSYNC operation may be applied for listed and unlisted cells while storing the real-time incoming I/Q samples. Once the CPICH is read or received, and enough I/Q samples on the CPICH are accumulated, collected or stored, the RF RX front-end 222 may be turned off for saving power. Subsequently, the searcher switch 320 may pass stored I/Q samples to the SSYNC searcher 314 followed by the MPD searcher 316 to detect an unlisted cell, for example. In this regard, the SSYNC operation and the MPD operable may be carried out through offline processing.

Once the UE 200 camps on a cell such as the cell 110, the UE 200 may start idle mode discontinuous receive (DRX) mode. In DRX mode, the UE 200 may sleep for most time and wake up only for a minimal duration for idle mode activities such as paging and neighbor search/measurement. During DRX wakeup periods, the cell search engine 300 may be signaled to carry out an idle mode cell search starting with PSYNC operation followed by MPD operation. Initially, the searcher switch 320 may be configured to pass real-time incoming I/Q samples sequentially from the RF Rx front-end 222 to the PSNC searcher 312 and the MPD searcher 316, respectively, for searching neighbor cells. Once a neighbor cell is detected, the searcher switch 320 may be configured to pass real-time incoming I/Q samples sequentially from the RF Rx front-end 222 to the MPD searcher 316 for cell measurement on the detected neighbor cell.

Figure 4:
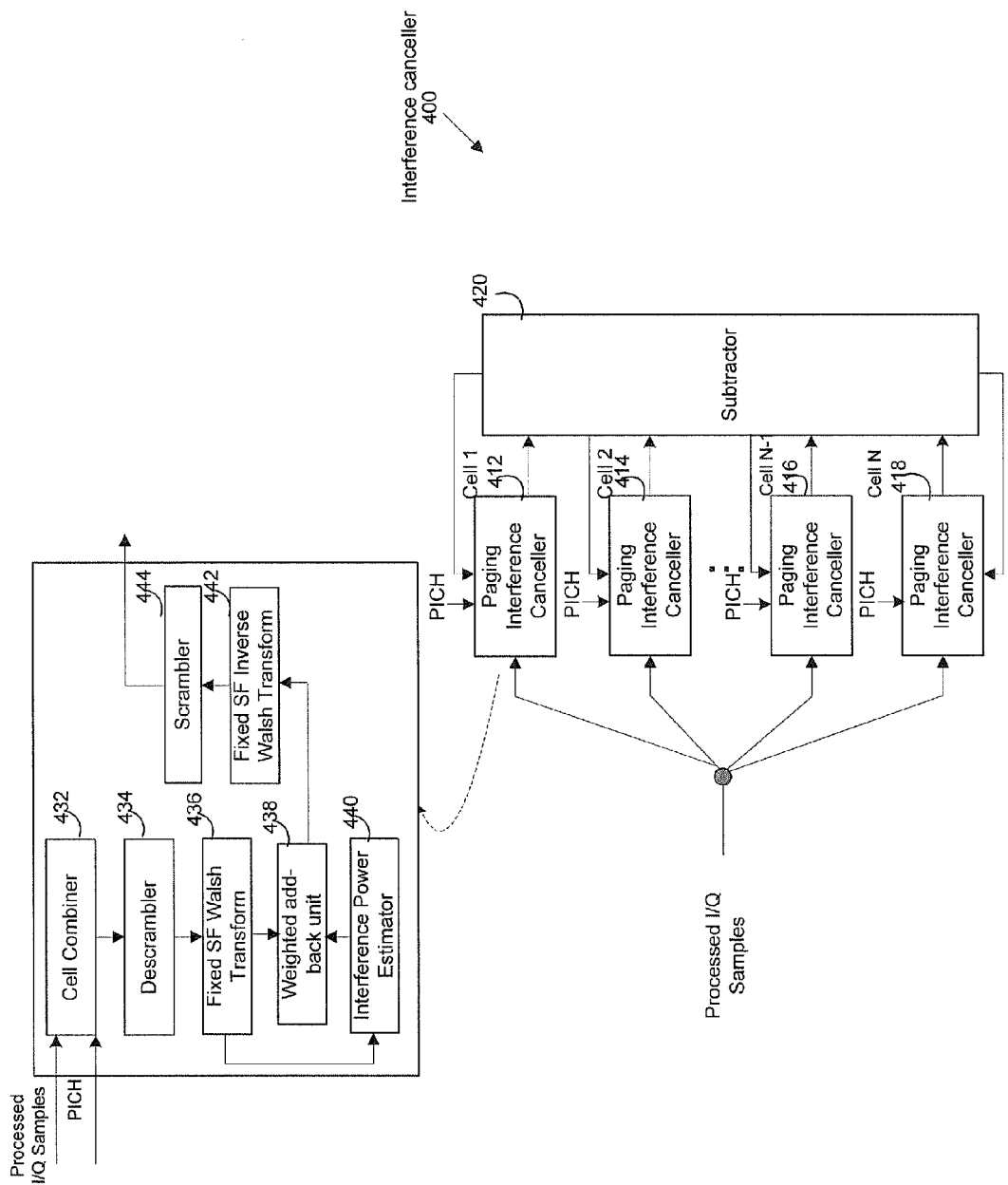
FIG. 4 is a block diagram illustrating an exemplary interference canceller that is operable to cancel interference caused by unlisted cells to enhance paging performance, in accordance with an embodiment of the invention.

FIG. 4 is a block diagram illustrating an exemplary interference canceller that is operable to cancel interference caused by unlisted cells for enhanced paging performance, in accordance with an embodiment of the invention. Referring to FIG. 4, there is shown an interference canceller 400 comprising a subtractor 420 and a plurality of paging interference cancellers, of which paging interference cancellers (PICs) 412 through 418 are illustrated.

A paging interference canceller such as the paging interference canceller 412 may comprise suitable logic, circuitry, interfaces and/or code that may be operable to eliminate or cancel interference of unlisted cells from subsequent cell searches. An exemplary implementation in a WCDMA system for the paging interference canceller 412 may comprise a cell combiner 432, a descrambler 434, a fixed spreading factor (SF) Walsh transform unit 436, a weighted add-back unit 438, an interference power estimator 440, a fixed SF inverse Walsh transform unit 442 and a scrambler 444.

The cell combiner 432 may comprise suitable logic, circuitry, interfaces and/or code that may be operable to combine I/Q samples on the CPICH according to multipath information provided by host processor 230.

The descrambler 434 may comprise suitable logic, circuitry, interfaces and/or code that may be operable to descramble the combined I/Q samples from the cell combiner 432 with PSC provided for unlisted cells.

The fixed SF Walsh transform unit 436 may comprise suitable logic, circuitry, interfaces and/or code that may be operable to perform fixed SF Walsh transform on the descrambled I/Q samples from the descrambler 434.

The weighted add-back unit 438 may comprise suitable logic, circuitry, interfaces and/or code that may be operable to eliminate or mitigate interference from the I/Q samples provided by the fixed SF Walsh transform unit 436. In this regard, the weighted add-back unit 438 may be operable to weight combine the I/Q samples from the fixed SF Walsh transform unit 436 based on interference power estimates provided by the interference power estimator 440. Power estimates associated with the unlisted cells may be eliminated from the resulting combined I/Q samples.

The interference power estimator 440 may comprise suitable logic, circuitry, interfaces and/or code that may be operable to utilize the combined I/Q samples from the weighted add-back unit 438 to estimate the total orthogonal variable spreading factor (OVSF) power associated with the unlisted cells.

The fixed SF inverse Walsh transform unit 442 may comprise suitable logic, circuitry, interfaces and/or code that may be operable to perform fixed SF inverse Walsh transform on the I/Q samples from the weighted add-back unit 438.

The scrambler 444 may comprise suitable logic, circuitry, interfaces and/or code that may be operable to scramble the I/Q samples from the fixed SF inverse Walsh transform unit 442 with PSC provided for unlisted cells. The resulting scrambled I/Q samples may be provided to the subtractor 420 to remove interference power estimates from the I/Q samples from the fixed SF inverse Walsh transform unit 442.

In an exemplary operation, a paging interference canceller such as the paging interference canceller 412 may be operable to eliminate or cancel interference of unlisted cells from subsequent cell search. Upon the detection of an unlisted cell, the paging interference canceller 412 may be operable to measure or calculate power estimates for the detected unlisted cells in order to remove interference caused by the detected unlisted cells from the I/Q samples. The paging interference canceller 412 may be operable to eliminate the impairments of the detected unlisted cell via the subtractor 420 according to the corresponding multipath profiles and associated power levels provided by the host processor 230 for the detected unlisted cell. The subtractor 420 may comprise suitable logic, circuitry, interfaces and/or code that may be operable to subtract power levels associated with corresponding multipath profiles for unlisted cells from signals associated with listed cells.

Figure 5:
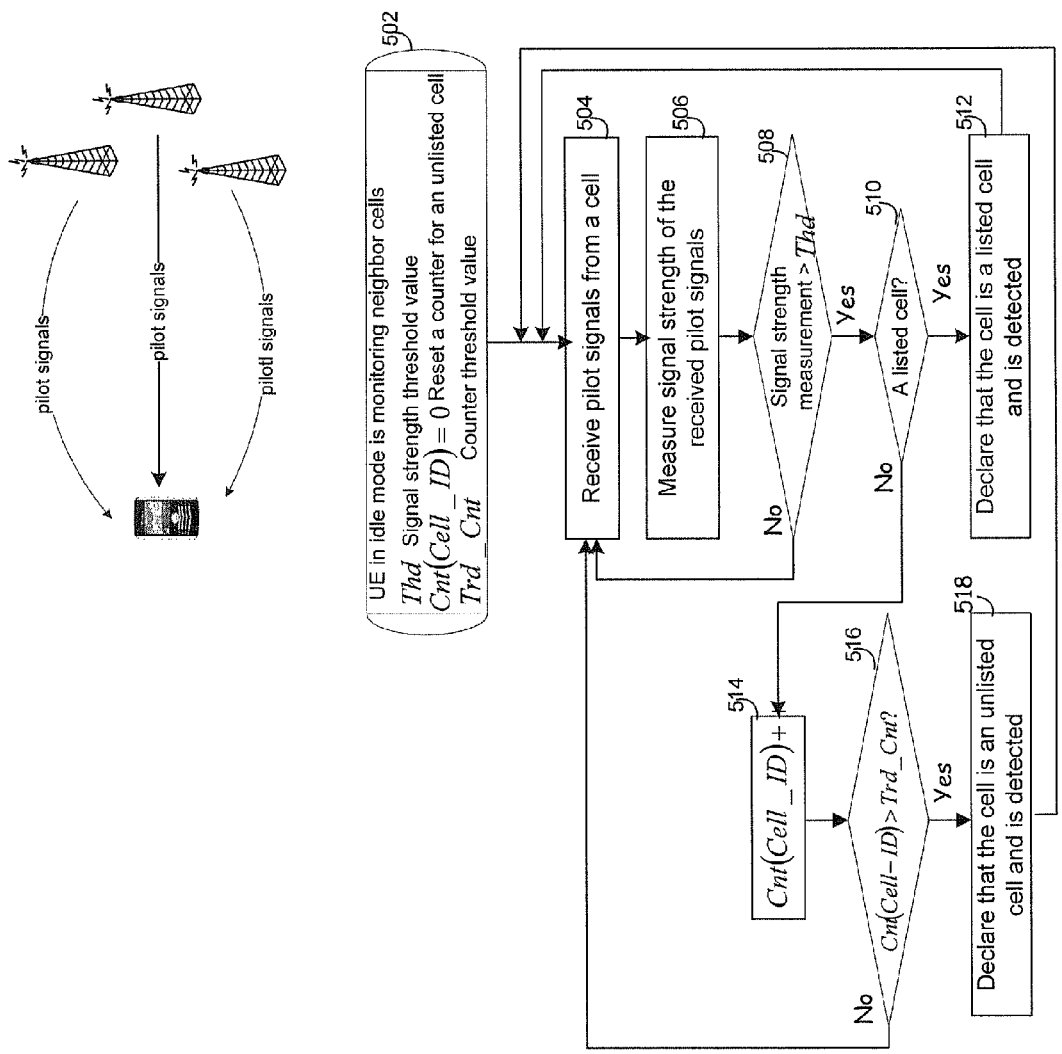
FIG. 5 is a block diagram illustrating exemplary steps that may be performed by a user equipment to identify presence of listed cells and unlisted cells in idle mode, in accordance with an embodiment of the invention.

FIG. 5 is a block diagram illustrating exemplary steps that may be performed by a user equipment to identify the presence of listed cells and unlisted cells in idle mode, in accordance with an embodiment of the invention. Referring to FIG. 5, the exemplary steps may start with step 502. In step 502, a UE such as the UE 200, which is operating in an idle mode, is monitoring neighbor cells. The parameter of Thd represents a signal strength threshold value. The parameter of Cnt(Cell_ID) represents a measurement counter maintained for a cell available in a geographic area of interest. The parameter of Trd_Cnt is a counter threshold value representing the maximum number of attempts of identifying an unlisted cell. In step 504, the UE 200 may be operable to receive pilot signals from a cell available in the geographic area of interest. In step 506, the UE 200 may be operable to measure or calculate signal strength of the received signal pilot signals. In step 508, it may be determined whether the signal strength measurements are >Thd. In instances where the signal strength measurements for the cell are >Thd, then in step 510, it may be determined whether the cell is listed in a neighboring cell list provided by the network. In instances where the cell is a listed cell, then in step 512, the UE 200 may declare that the cell listed in the neighboring cell is detected.

In step 508, in instances where the signal strength measurements for the cell are ≤Thd, then the exemplary steps may return to step 504. In step 510, in instances where the cell is not a listed cell, then in step 514, the counter Cnt(Cell_ID) is increased by a step of 1. In step 516, it may be determined whether Cnt(Cell-ID)>Trd_Cnt. In instances where Cnt(Cell-ID)>Trd_Cnt, the UE 200 may be operable to declare that the cell, an unlisted cell, is detected. In step 516, in instances where Cnt(Cell-ID)≤Trd_Cnt, the exemplary steps may return to step 504.

Figure 6:
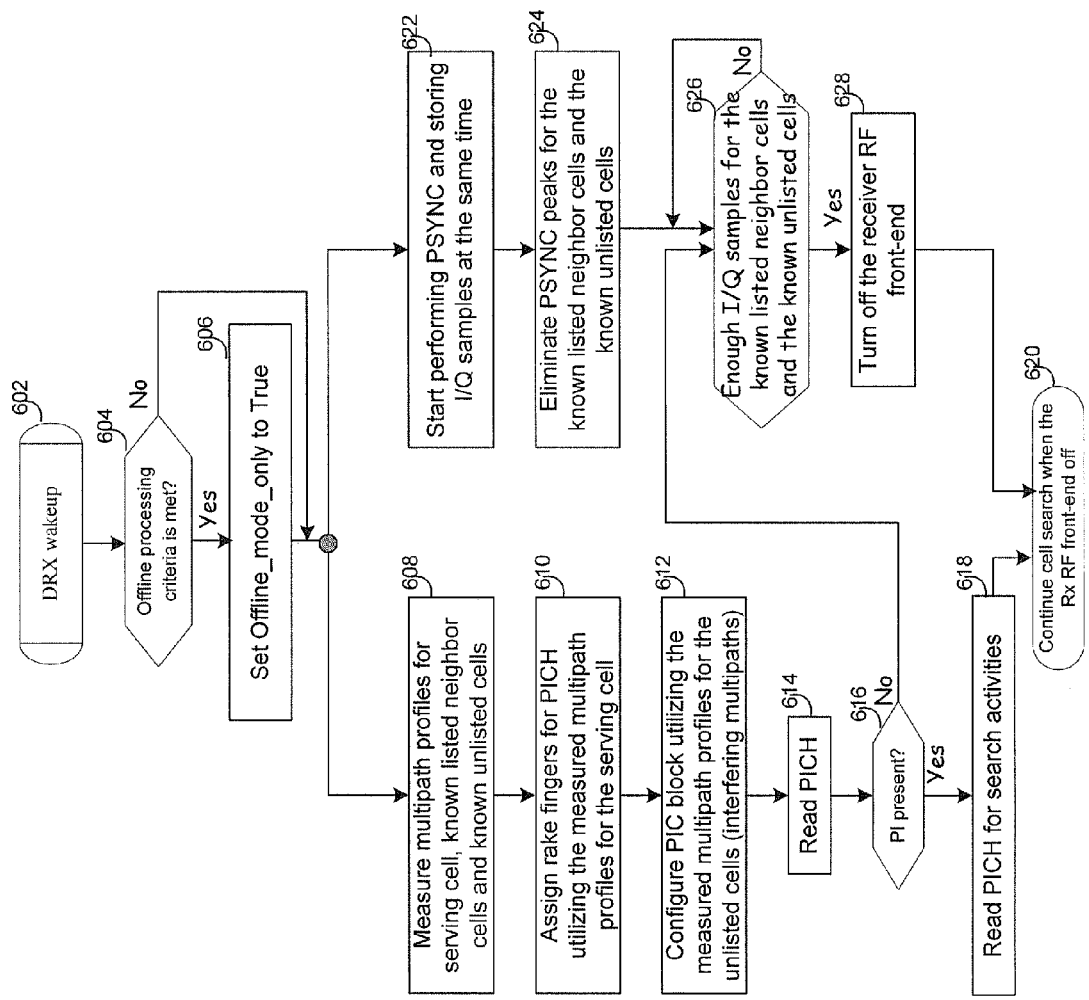
FIG. 6 is a block diagram illustrating exemplary steps that may be performed by a user equipment to carry out real-time processing for mitigation of unlisted cell impacts in idle mode, in accordance with an embodiment of the invention.

FIG. 6 is a block diagram illustrating exemplary steps that may be performed by a user equipment to carry out real-time processing for mitigation of unlisted cell impacts in idle mode, in accordance with an embodiment of the invention. Referring to FIG. 6, the exemplary steps may start with step 602. In step 602, a UE such as the UE 200, that is operating in an idle mode, wakes up to monitor neighbor cells. In step 604, it may be determined whether offline processing criteria for cell search is met. In instances where the offline processing criteria for the cell search is met, then in step 606, the UE 200 may set a flag, Offline_mode_only, to be true to indicate the UE 200 performs cell search through offline processing only. In step 608, the UE 200 may be operable to measure multipath profiles for the serving cell, known listed neighbor cells and known unlisted cells. In step 610, the UE 200 may be operable to assign rake fingers for the CPICH utilizing the measured multipath profiles for the serving cell. In step 612, the UE 200 may be operable to configure paging interference cancellers (PICs) utilizing the measured multipath profiles for the unlisted cells. In step 614, the UE 200 may read or receive CPICH. In step 616, it may be determined whether pilot indicator (PI) is present. In instances where a PI is present, then in step 618, the UE 200 may read or receive the CPICH to support cell search activities. The exemplary steps may continue cell search in step 620 while the RF Rx front-end 222 is turned off.

From step 606, the exemplary steps may proceed in step 622. In step 622, the UE 200 may start performing PSYNC operation and storing I/Q samples on the CPICH at the same time. In step 624, the UE 200 may be operable to eliminate PSYNC peaks for known listed neighbor cells and the known unlisted cells. In step 626, it may be determined whether enough I/Q samples on the CPICH are collected. In instances where enough I/Q samples on the CPICH are collected, then in step 628, the UE 200 may be configured to turn off the RF Rx front end 222 to save power. The exemplary steps may continue cell search in step 620 while the RF Rx front-end 222 is turned off.

Figure 7:
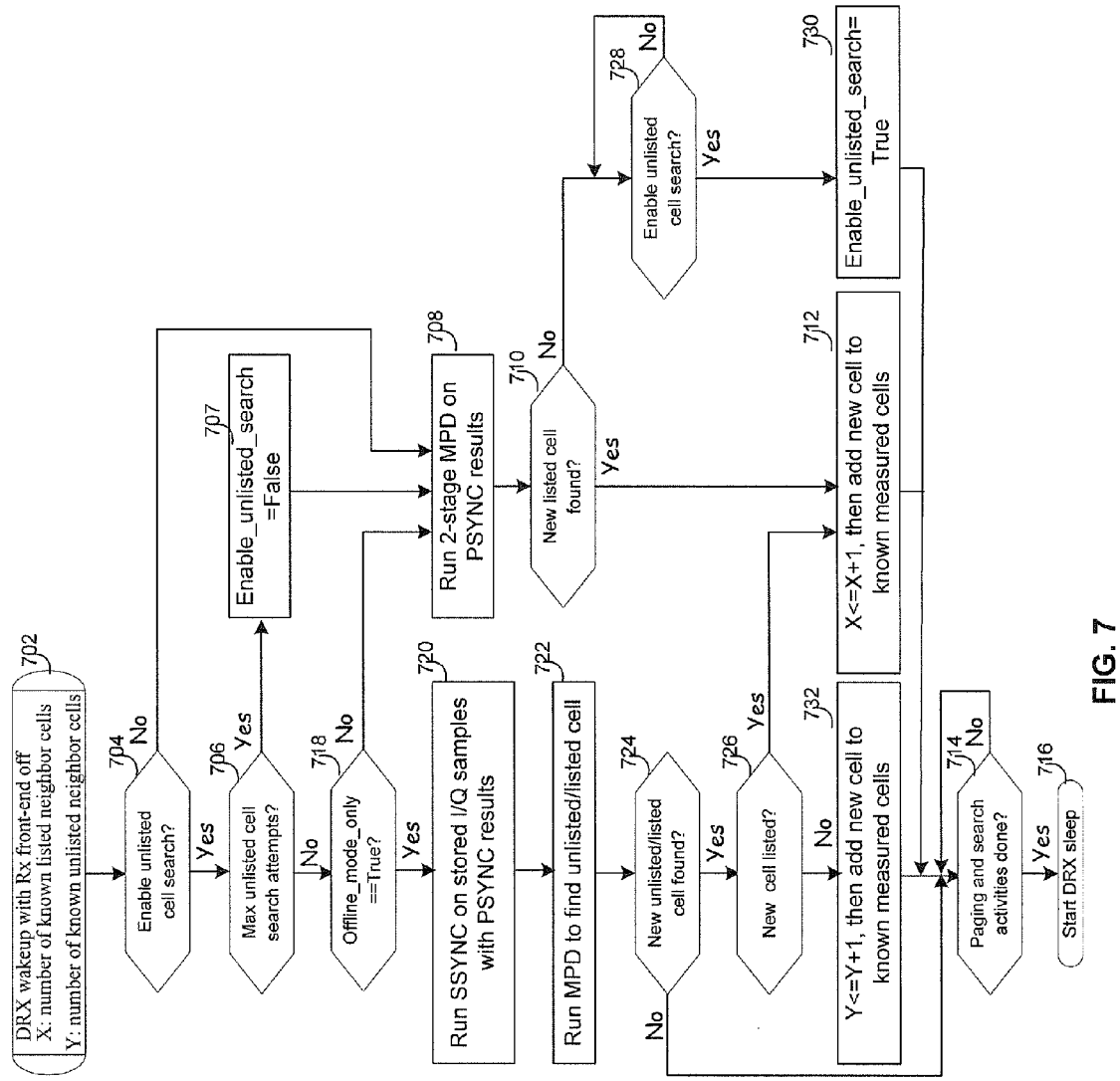
FIG. 7 is a block diagram illustrating exemplary steps that may be performed by a user equipment to carry out offline processing for mitigation of unlisted cell impacts in idle mode, in accordance with an embodiment of the invention.

FIG. 7 is a block diagram illustrating exemplary steps that may be performed by a user equipment to carry out offline processing for mitigation of unlisted cell impacts in idle mode, in accordance with an embodiment of the invention. Referring to FIG. 7, the exemplary steps may start with step 702. In step 702, a UE such as the UE 200, which is operating in an idle mode, wakes up to monitor neighbor cells. The UE 200 has collected or stored enough I/Q samples on the CPICH from the Rx RF front-end 222 and the Rx RF front-end 222 is off. The parameters X and Y are the maximum number of known listed and unlisted neighbor cells, respectively. In step 704, it may be determined whether an unlisted cell search needs to be enabled. In instances where the unlisted cell search needs to be enabled, then in step 706, it may be determined whether the maximum unlisted cell search attempts are reached. In instances where the maximum unlisted cell search attempts are reached, then in step 707, the UE 200 may be operable to disable cell search for unlisted cell by setting the parameter enable_unlisted_search=false. In step 708, the UE 200 may be operable to perform the idle mode cell search, that is, the 2-stage MPD, on PSYNC results. In step 710, it may be determined whether a new listed cell is detected or found. In instances where a new listed cell is found, then in step 712, the UE 200 may add the new cell to known measured cells if the maximum number of known listed cells is not reached. In step 714, it may be determined whether paging and search activities are done. In instances where paging and search activities are done, then in step 716, the UE 200 may end the wakeup period and start a sleep period.

In step 704, in instances where the unlisted cell search does not need to be enabled, then the exemplary steps may proceed in step 708.

In step 706, in instances where the maximum unlisted cell search attempts are not yet reached, then in step 718, the UE 200 may check whether the parameter offline_mode_only=true. In instances where the parameter offline_mode_only=true, then in step 720, the UE 200 may be operable to run or execute SSYNC operation on stored I/Q samples with PSYNC results. In step 722, the UE 200 may be operable to perform or run MPD to find or identify unlisted or listed cells. In step 724, it may be determined whether a new unlisted or listed cell is found or detected. In instances where a new unlisted or listed cell is found, then in step 726, it may be determined whether the new cell is listed in the neighboring cell list provided by the network. In instances where the new cell is listed in the neighboring cell list, then the exemplary steps may proceed in step 712.

In step 710, in instances where a new listed cell is not found, then in step 728, the UE 200 may determine whether cell search for unlisted cells is enabled. In instances where cell search for unlisted cells is enabled, then in step 730. In step 730, the UE 200 may enable cell search for unlisted cells by setting the parameter enable_unlisted_search=true.

In step 714, in instances where paging and search activities are not done, then the exemplary steps may stay in step 714.

In step 724, in instances where a new unlisted or listed cell is not found, then the exemplary steps may proceed in step 714.

In step 726, in instances where the new cell is not listed in the neighboring cell list, then in step 732, the UE 200 may add the new cell to known measured cells if the maximum number of known unlisted cells is not reached.

In step 728, in instances where cell search for unlisted cells is not enabled, then the exemplary steps may stay in step 728.

In various exemplary aspects of the method and system for mitigation of unlisted cell impacts in idle mode of cellular systems, as described with respect to FIG. 1-FIG. 8, a UE such as the UE 200 may be operable to receive signals from a serving cell such as the cell 110 and a plurality of neighbor cells. The neighbor cells may comprise one or more neighbor cells such as the cells 120-140 that are listed in a neighboring cell list provided by the network, and one or more neighbor cells such as the cells 150-170 that are not listed in the neighboring cell list. The UE 200 may be operable to validate the presence of the serving cell, the one or more listed neighbor cells and the one or more unlisted neighbor cells from the received signals. Cell measurement such as multipath profile measurement and associated power levels may be performed on the listed cells as well as the unlisted cells. The UE 200 may maintain a counter to count or track number of attempts of the cell measurements for the unlisted cells. In instances where the counted number becomes greater than a threshold value, the UE 200 may declare or validate presence of the unlisted cells. Cell selection and/or reselection may be optimized based on the cell measurements on both the listed cells and the unlisted cells to enhance UE performance such as UE paging performance. For example, the UE 200 may be operable to select the best available cell from the physically available cells in a geographic area of interest regardless whether the physically available cells are listed or unlisted in the neighboring cell list. The UE 200 may be operable to camp on the selected best available cell for desired services. The cell measurements for the serving cell may be utilized to configure the UE 200 to receive signals. For example, in instances where the UE 200 may comprise a rake receiver, the UE 200 may be operable to assign rake fingers based on the cell measurements for the serving cell. Interference caused by the unlisted cells may be eliminated based on the cell measurements for the unlisted cells. I/Q samples of the received signals may be collected or stored while monitoring or measuring the CPICH. The UE 200 may turn off the receiver RF front-end 222 to save power if enough I/Q samples are stored. The UE 200 may be operable to remove or mitigate interference caused by the unlisted cells from the stored I/Q samples. The UE 200 may be operable to utilize the stored I/Q samples to support or perform various baseband procedures such as cell search through offline processing subsequent to interference processing.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for mitigation of unlisted cell impacts in idle mode of cellular systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for operating a user equipment, comprising:
receiving, by the user equipment, signals from a serving cell and a plurality of neighbor cells, wherein the plurality of neighbor cells include listed neighbor cells that are listed in a neighboring cell list and unlisted neighbor cells that are unlisted in the neighboring cell list;

storing, by the user equipment, samples of the received signals from the listed neighbor cells and the unlisted neighbor cells;

performing, by the user equipment, a cell search within the stored samples of the received listed and unlisted neighbor cell signals to identify a first unlisted neighbor cell from among the unlisted neighbor cells, the cell search comprising:

validating the first unlisted neighbor cell based on a corresponding stored sample from among the stored samples of the received listed and unlisted neighbor cell signals;

adding the validated unlisted neighbor cell to the neighboring cell list; and mitigating interference, caused by the validated unlisted neighbor cell, from the stored samples of the received listed and unlisted neighbor cell signals; and repeating, by the user equipment, the cell search for a second unlisted neighbor cell from among the unlisted neighbor cells using the mitigated stored samples.

2. The method of claim 1, wherein the validating comprises:

measuring a signal strength of the first unlisted neighbor cell.

3. The method of claim 2, further comprising:

storing the measured signal strength of the received signal from the first unlisted neighbor cell.

4. The method of claim 3, further comprising:

deactivating the receiving of subsequent signals from the serving cell and the plurality of neighbor cells when a quantity of the stored samples of the received listed and unlisted neighbor cell signals exceeds a threshold.

5. The method of claim 2, wherein the validating further comprises:

validating the first unlisted neighbor cell when the signals from the unlisted neighbor cells reach a number exceeding a validation threshold value.

6. The method of claim 2, further comprising:

tracking the number of cell measurement attempts that are greater than a signal strength threshold value.

7. The method of claim 1, wherein the validating comprises:

acquiring synchronization for the first unlisted neighbor cell; and identifying information about the first unlisted neighbor cell.

8. The method of claim 1, wherein the signals are received in an idle mode, and wherein the cell search is performed through offline processing.

9. The method of claim 1, wherein the cell search further comprises:

identifying the first unlisted neighbor cell from among the unlisted neighbor cells.

10. The method of claim 1, wherein the validating the first unlisted neighbor cell comprises:

calculating or estimating a signal strength of the first unlisted neighbor cell; and determining that the signal strength of the first unlisted neighbor cell is unmatched to signal strengths of the listed neighbor cells in the neighboring cell list.

11. A method for operating a user equipment in an idle mode, comprising:

receiving, by the user equipment, signals from a serving cell and a plurality of neighbor cells, wherein the plurality of neighbor cells include listed neighbor cells that are listed in a neighboring cell list and unlisted neighbor cells that are unlisted in the neighboring cell list;

storing, by the user equipment, samples of the received signals from the listed neighbor cells and the unlisted neighbor cells;

performing, by the user equipment, a cell search within the stored samples to identify a first unlisted neighbor cell from among the unlisted neighbor cells, the cell search comprising:

validating the first unlisted neighbor cell based on a corresponding stored sample from among the stored samples, wherein the validating comprises measuring a signal strength of the first unlisted neighbor cell;

adding the validated unlisted neighbor cell to the neighboring cell list; and mitigating interference, caused by the validated unlisted neighbor cell, from the stored samples;

repeating, by the user equipment, the cell search for a second unlisted neighbor cell from among the unlisted neighbor cells using the mitigated stored samples; and using the validated unlisted neighbor cell as a subsequent serving cell based on a measured multipath profile and an associated power level of the validated unlisted neighbor cell.

12. A user equipment, comprising:

a receiver configured to receive signals from a serving cell and a plurality of neighbor cells, wherein the plurality of neighbor cells include listed neighbor cells that are listed in a neighboring cell list and unlisted neighbor cells that are unlisted in the neighboring cell list;

a memory; and a processor configured to:

store, in the memory, samples of the received signals from the listed neighbor cells and the unlisted neighbor cells;

perform a cell search within the stored samples of the received listed and unlisted neighbor cell signals to identify a first unlisted neighbor cell from among the unlisted neighbor cells;

validate the first unlisted neighbor cell based on a corresponding first stored sample from among the stored samples of the received listed and unlisted neighbor cell signals;

add the validated unlisted neighbor cell to the neighboring cell list;

mitigate interference caused by the validated unlisted neighbor cell from the stored samples of the received listed and unlisted neighbor cell signals; and perform a second cell search for a second unlisted neighbor cell from among the unlisted neighbor cells using the mitigated stored samples.

13. The user equipment of claim 12, wherein the processor is further configured to measure signal strengths of the unlisted neighbor cells.

14. The user equipment of claim 13, wherein the processor is further configured to measure a multipath profile and an associated power level for each of the unlisted neighbor cells.

15. The user equipment of claim 13, wherein the processor is further configured to store, in the memory, the measured signal strengths.

16. The user equipment of claim 15, wherein the processor is further configured to deactivate the receiver when a quantity of the stored samples of the received listed and unlisted neighbor cell signals exceeds a threshold.

17. The user equipment of claim 13, further comprising: a counter for tracking the number of measured signal strengths of the unlisted neighbor cells that are greater than a signal strength threshold value.

18. The user equipment of claim 17, wherein the processor is further configured to validate an unlisted neighbor cell from among the unlisted neighbor cells when a quantity of the unlisted neighbor cells with measured signal strengths exceeding the signal strength threshold value is greater than a validation threshold value.

19. The user equipment of claim 12, wherein the processor is further configured to:
   acquire synchronization for the unlisted neighbor cells; and
   identify information about the unlisted neighbor cells.

20. The user equipment of claim 12, wherein the receiver is further configured to operate in an idle mode, and
   wherein the processor is further configured to perform the cell search through offline processing.

21. The user equipment of claim 12, wherein the processor is further configured to identify the first unlisted neighbor cell from among the unlisted neighbor cells.

22. The user equipment of claim 12, wherein the processor is further configured to validate the first unlisted neighbor cell when a signal strength of the first unlisted neighbor cell is unmatched to signal strengths of the listed neighbor cells in the neighboring cell list.

\* \* \* \* \*